(12) United States Patent
Nene

(10) Patent No.: US 10,305,385 B2
(45) Date of Patent: May 28, 2019

(54) INTERLEAVED RESONANT CONVERTER

(71) Applicant: TEXAS INSTRUMENTS INCORPORATED, Dallas, TX (US)

(72) Inventor: Hrishikesh Ratnakar Nene, Katy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/481,181

(22) Filed: Apr. 6, 2017

(65) Prior Publication Data

US 2018/0091059 A1 Mar. 29, 2018

Related U.S. Application Data

(60) Provisional application No. 62/400,262, filed on Sep. 27, 2016.

(51) Int. Cl.
*H02M 3/335* (2006.01)
*H02M 1/084* (2006.01)
*H02M 3/337* (2006.01)
*H02M 1/00* (2006.01)

(52) U.S. Cl.
CPC ....... *H02M 3/33507* (2013.01); *H02M 1/084* (2013.01); *H02M 3/3376* (2013.01); *H02M 2001/0009* (2013.01); *H02M 2001/0058* (2013.01); *Y02B 70/1433* (2013.01); *Y02B 70/1491* (2013.01)

(58) Field of Classification Search
CPC . H02M 2007/4815; H02M 2007/4818; H02M 1/083; H02M 3/33507; H02M 3/1584; H02M 3/285; H02M 3/33561; H02M 7/49; H02M 3/1582; H02M 7/153; H02M 7/08; H02M 1/088; H02M 7/17; H02M 2001/00; H02J 3/46; H02J 3/38
USPC .......................... 363/21.02, 21.03, 65, 71–72
See application file for complete search history.

(56) References Cited

U.S. PATENT DOCUMENTS

| 5,731,968 A * | 3/1998 | Van Der Broeck ...... H05G 1/20 363/17 |
| 6,055,169 A * | 4/2000 | Bowman .................. H02J 1/102 363/65 |
| 2009/0230941 A1* | 9/2009 | Vogel ..................... B23K 9/091 323/305 |

(Continued)

OTHER PUBLICATIONS

Chen, Hui, et al. "Current balance method for the two-phase interleaved LLC-RDCX with parallel PWM output regulation." Power Electronics and Application Conference and Exposition (PEAC), 2014 International. IEEE, 2014.

(Continued)

*Primary Examiner* — Nguyen Tran
(74) *Attorney, Agent, or Firm* — Kenneth Liu; Charles A. Brill; Frank D. Cimino

(57) ABSTRACT

One example includes an interleaved resonant converter circuit. The circuit includes a plurality of resonant converter circuits that are each coupled to an output node and are configured to collectively generate an output voltage on the output node in response to a respective plurality of sets of switching signals at each of a respective plurality of phases. The circuit also includes a switching controller configured to generate each of the plurality of sets of switching signals having a variable duty-cycle relative to each other at each of the plurality of phases.

19 Claims, 2 Drawing Sheets

(56) References Cited

U.S. PATENT DOCUMENTS

2012/0026754 A1* 2/2012 Ye .................. H02M 3/285
　　　　　　　　　　　　　　　　　363/17

OTHER PUBLICATIONS

Hu, Zhiyuan, et al. "An interleaved LLC resonant converter operating at constant switching frequency." IEEE Transactions on Power Electronics 29.6 (2014): 2931-2943.

Orietti, E., et al. "Two-phase interleaved LLC resonant converter with current-controlled inductor." Power Electronics Conference, 2009. COBEP'09. Brazilian. IEEE, 2009.

* cited by examiner

INTERLEAVED RESONANT CONVERTER

RELATED APPLICATIONS

This application claims priority of U.S. Provisional Application Ser. No. 62/400,262, filed 27 Sep. 2016, which is incorporated herein in its entirety.

TECHNICAL FIELD

This disclosure relates generally to electronic systems, and more specifically to an interleaved resonant converter.

BACKGROUND

Power converters are implemented in a variety of circuit applications to convert one form of power voltage (e.g., AC or DC) to a voltage of a different form or amplitude. One example of a power converter is a resonant converter that is a popular DC-DC converter frequently used in server, telecom, automotive and other power supply applications. Resonant converters are typically held to increasingly high performance goals, such as with respect to efficiency, power density, more demanding standards (e.g., energy star—platinum standard), and power density. As a result, resonant converters are a popular choice for medium to high power (up to 10 kW) applications. High power requirements for a given power application can necessitate multi-phase interleaved operation. However, interleaving multiple phases of resonant converters presents current-sharing challenges between the phases. Such current-sharing problems can often manifest in converter failure and/or significant system/component damage.

SUMMARY

One example includes an interleaved resonant converter circuit. The circuit includes a plurality of resonant converter circuits that are each coupled to an output node and are configured to collectively generate an output voltage on the output node in response to a respective plurality of sets of switching signals at each of a respective plurality of phases. The circuit also includes a switching controller configured to generate each of the plurality of sets of switching signals having a variable duty-cycle relative to each other at each of the plurality of phases.

Another example includes a method for controlling an interleaved resonant converter circuit. The method includes generating a plurality of sets of switching signals at each of a respective plurality of phases. Each of the plurality of sets of switching signals can be provided to a respective plurality of resonant converter circuits that are each coupled to an output node to collectively generate an output voltage on the output node in response to a respective plurality of sets of switching signals. The method also includes receiving a plurality of feedback currents from the respective plurality of resonant converter circuits. The method further includes adjusting a duty-cycle of at least one of the plurality of sets of switching signals in response to the plurality of feedback currents.

Another example includes an interleaved resonant converter circuit. The circuit includes a plurality of resonant converter circuits that are each coupled to an output node and are configured to generate an output voltage on the output node at each of a plurality of phases. Each of the resonant converter circuits includes a transformer configured to induce a switching current from a primary winding of the transformer to a secondary winding of the transformer, wherein the output voltage is generated via the induced switching current through the secondary winding of the transformer. Each of the resonant converter circuits also includes at least one switch that is activated in response to a respective one of a plurality of sets of switching signals to provide the switching current through the primary winding during a respective one of a plurality of phases. The circuit also includes a switching controller configured to generate each of the plurality of sets of switching signals having a variable duty-cycle relative to each other at each of the plurality of phases based on a current mismatch associated with each of the plurality of resonant converter circuits.

DETAILED DESCRIPTION

This disclosure relates generally to electronic systems, and more specifically to an interleaved resonant converter. An interleaved resonant converter can include a plurality of resonant converters and a switching controller. The resonant converters can each include a transformer and at least one switch (e.g., transistor device). The switch(es) is configured to be activated in response to a respective at least one switching signal that is generated via the switching controller to generate a switching current, and the transformer is configured to conduct the switching current in a primary winding to induce the switching current as an output current through the secondary winding of the transformer. As an example, the switch(es) of a given one of the resonant converters can be activated during one of a plurality of separate phases to provide the output current, and thus an output voltage, on a common output node during the respective phase. Accordingly, the resonant converters can alternately provide the output voltage on the output node at each of the respective phases in response to the respective switching signals.

The switching controller can be configured to generate the sets of switching signals that are provided, respectively, to the resonant converters. The switching signals can have a duty-cycle that can be variable based on a current mismatch associated with the resonant converters. For example, in response to a relative difference in gain between the resonant converters, such as from fabrication and process tolerance mismatches, and thus a consequent difference in relative output current amplitudes, the switching controller can adjust the duty-cycle of a given set of switching signals relative to at least one other set of switching signals to substantially equalize the output current of the respective resonant converters, and thus the amplitude of the output voltage provided at each of the respective phases. For example, each of the resonant converters can be configured to provide a feedback current to the switching controller that is indicative of the output current of the respective resonant converter. Accordingly, the switching controller can adjust (e.g., decrease) the duty-cycle of at least one set of switching signals to substantially equalize the current of the resonant converters, and thus the amplitude of the output voltage generated by each of the resonant converters at each of the respective phases.

Figure 1:
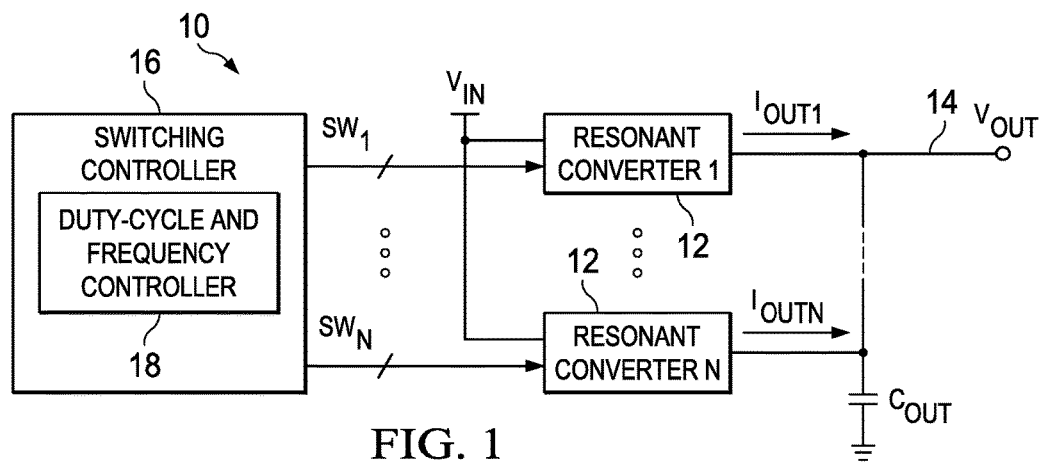
FIG. 1 illustrates an example of an interleaved resonant converter system.

FIG. 1 illustrates an example of an interleaved resonant converter system 10. The interleaved resonant converter system 10 can be implemented in any of a variety of power converting applications to convert a DC voltage, demonstrated in the example of FIG. 1 as an input voltage $V_{IN}$, to another DC voltage, demonstrated as an output voltage $V_{OUT}$, having a different amplitude. In the example of FIG. 1, the interleaved resonant converter system 10 includes a plurality N of resonant converters 12, where N is a positive integer. The resonant converters 12 are each configured to generate the output voltage $V_{OUT}$ at an output node 14 based on the input voltage $V_{IN}$ at each of a respective plurality N of phases. As an example, each of the resonant converters 12 can be fabricated substantially the same, such as including substantially identical circuit components.

The interleaved resonant converter system 10 also includes a switching controller 16 that is configured to generate a respective plurality N of sets of switching signals, demonstrated as $SW_1$ through $SW_N$, that are provided to the respective resonant converters 12. The resonant converters 12 can each include at least one switch that is configured to couple at least one of the input voltage $V_{IN}$ and a low-voltage rail (e.g., ground) to a switching node, such as coupled to an inductor, in response to activation by the respective switching signal set. As an example, each of the sets of switching signals $SW_1$ through $SW_N$ can include a single switching signal to activate a respective single switch, or can include a pair of switching signals to respectively and alternately activate a high-side switch and a low-side switch, respectively. Therefore, the sets of switching signals $SW_1$ through $SW_N$ each have a duty-cycle corresponding to the alternate logic-states of the respective switching signals $SW_1$ through $SW_N$ that are associated with activation and deactivation of the respective at least one switch of the respective resonant converters 12.

As described herein, the resonant converters 12 are interleaved, such that a given one of the resonant converters 12 is sequentially activated via the respective set of the switching signals $SW_1$ through $SW_N$ during a respective phase (e.g., of a period) to provide the output voltage $V_{OUT}$ at the output node 14 at a given time. Thus, as described herein, the term "phase" with respect to the interleaved operation of the resonant converters 12 refers to a relative phase of activation of the respective sets of switching signals $SW_1$ through $SW_N$ with respect to a period that encapsulates all of the sets of the switching signals $SW_1$ through $SW_N$. For example, for N=2, the sets of switching signals $SW_1$ and $SW_2$ operate the respective first and second resonant converters 12 to be 180° out-of-phase of each other. Similarly, for N=3, the sets of switching signals $SW_1$ through $SW_3$ operate the respective first, second, and third resonant converters 12 to be 120° out-of-phase of each other. As described herein, there is no limit to the number of resonant converters that operate in response to the respective sets of switching signals $SW_1$ through $SW_N$ to provide the output voltage $V_{OUT}$ at each of a respective plurality of phases.

In the example of FIG. 1, the switching controller 16 includes a duty-cycle and frequency controller 18. The duty-cycle and frequency controller 18 is configured to adjust a duty-cycle of at least one of the sets of switching signals $SW_1$ through $SW_N$. For example, each of the resonant converters 12 can include an inductor and a capacitor, such as in series with a primary winding of a transformer. The secondary winding of the transformer can conduct an induced output current, demonstrated in the example of FIG. 1 as currents $I_{OUT1}$ through $I_{OUTN}$, that generate the output voltage $V_{OUT}$, respectively, across an output capacitor $C_{OUT}$. The inductor and capacitor of each of the respective resonant converters 12 can form a resonant tank that has a resonant frequency, such that a frequency of switching of the at least one switch, and thus of the switching signals $SW_1$ through $SW_N$, can provide specific operating characteristics of the respective resonant converter 12. Therefore, the frequency of the respective set of the switching signals $SW_1$ through $SW_N$ relative to the resonant frequency of the resonant tank can dictate a gain of the respective resonant converter 12.

As described previously, the resonant converters 12 can be fabricated such that they are configured substantially identically. However, despite the intention of fabricating the resonant converters 12 to be substantially identical, there can be inherent fabrication and tolerance mismatches of the circuit components of the resonant converters 12. As a result, the operational characteristics of the circuit components of the resonant converters 12 can be slightly different, which can result in slight differences in the resonant frequency of the resonant tanks of the resonant converters 12. Accordingly, in response to substantially identical characteristics of the sets of switching signals $SW_1$ through $SW_N$, the resonant converters 12 can exhibit variation in the gain with respect to the output currents $I_{OUT1}$ through $I_{OUTN}$ that are generated in response to the respective sets of the switching signals $SW_1$ through $SW_N$. The variation of the gain of the respective resonant converters 12 can result in a variation of the amplitudes of the output currents $I_{OUT1}$ through $I_{OUTN}$ that are generated from the respective resonant converters 12 (e.g., induced in the secondary winding of the transformer) based on which the output voltage $V_{OUT}$ is generated. Such imbalance in amplitude of the output currents $I_{OUT1}$ through $I_{OUTN}$ of the respective resonant converters 12 can result in a decrease in efficiency of the interleaved resonant converter system 10, thermal stability problems, and/or damage or failure of the interleaved resonant converter system 10.

In response to a variation of gain of the resonant converters 12, and thus a consequent difference in relative amplitude of the output currents $I_{OUT1}$ through $I_{OUTN}$, the duty-cycle and frequency controller 18 is configured to adjust a duty-cycle of the respective sets of switching signals $SW_1$ through $SW_N$ relative to each other. As a result, the duty-cycle and frequency controller 18 can be configured to approximately equalize the amplitudes of the output currents $I_{OUT1}$ through $I_{OUTN}$. As an example, the duty-cycles can be tuned (e.g., trimmed) via the duty-cycle and frequency controller 18 during testing of the interleaved resonant converter system 10, such as by measuring the amplitudes of the output currents $I_{OUT1}$ through $I_{OUTN}$. As another example, the duty-cycle and frequency controller 18 can be configured to dynamically adjust the duty-cycles of the switching signals $SW_1$ through $SW_N$. For example, each of the resonant converters 12 can be configured to provide feedback information to the switching controller 16, with the feedback information thus corresponding to the resonant tank currents, and thus the respective amplitude of the output currents $I_{OUT1}$ through $I_{OUTN}$ of the respective resonant converters 12. As an example, the feedback information can be a feedback current associated with the respective resonant converter 12 that is proportional to the amplitude of the resonant tank current in the respective resonant converter 12. The switching controller 16 can thus compare the feedback current amplitudes, such that the duty-cycle and frequency controller 18 can be configured to adjust the duty-cycles of the switching signals $SW_1$ through $SW_N$ based on the comparison in a feedback manner. It is to be understood that other types of feedback information can be provided, such as temperature, magnetic field, or other types of parameters associated with the relative gain of the respective resonant converters 12.

Accordingly, the duty-cycle and frequency controller 18 can be configured to set the duty-cycles of the switching signals $SW_1$ through $SW_N$ to provide a substantially equal amplitude of the output currents $I_{OUT1}$ through $I_{OUTN}$, and thus a substantially equal contribution to the amplitude of the output voltage $V_{OUT}$ at each of the plurality of sequential phases. As a result, the interleaved resonant converter system 10 can implement balanced interleaving in a simplistic manner, and thus without adding additional circuitry that can add additional cost, space, and complexity. In addition, the operation of the duty-cycle and frequency controller 18 can compensate for variations in the circuit components of the resonant converters 12, such that the interleaved resonant converter system 10 need not be fabricated with tight manufacturing tolerances of the associated circuit components therein that contribute to the resonant frequency of the resonator tank, thus reducing manufacturing costs. Furthermore, the operation of the interleaved resonant converter system 10, with respect to providing the balanced interleaving in generating the output voltage $V_{OUT}$, can be provided in a highly scalable manner with respect to multiple phases, implementation on a variety of digital controllers, and power settings. Accordingly, the interleaved resonant converter system 10 can be versatile in addition to low-cost and reliable.

Figure 2:
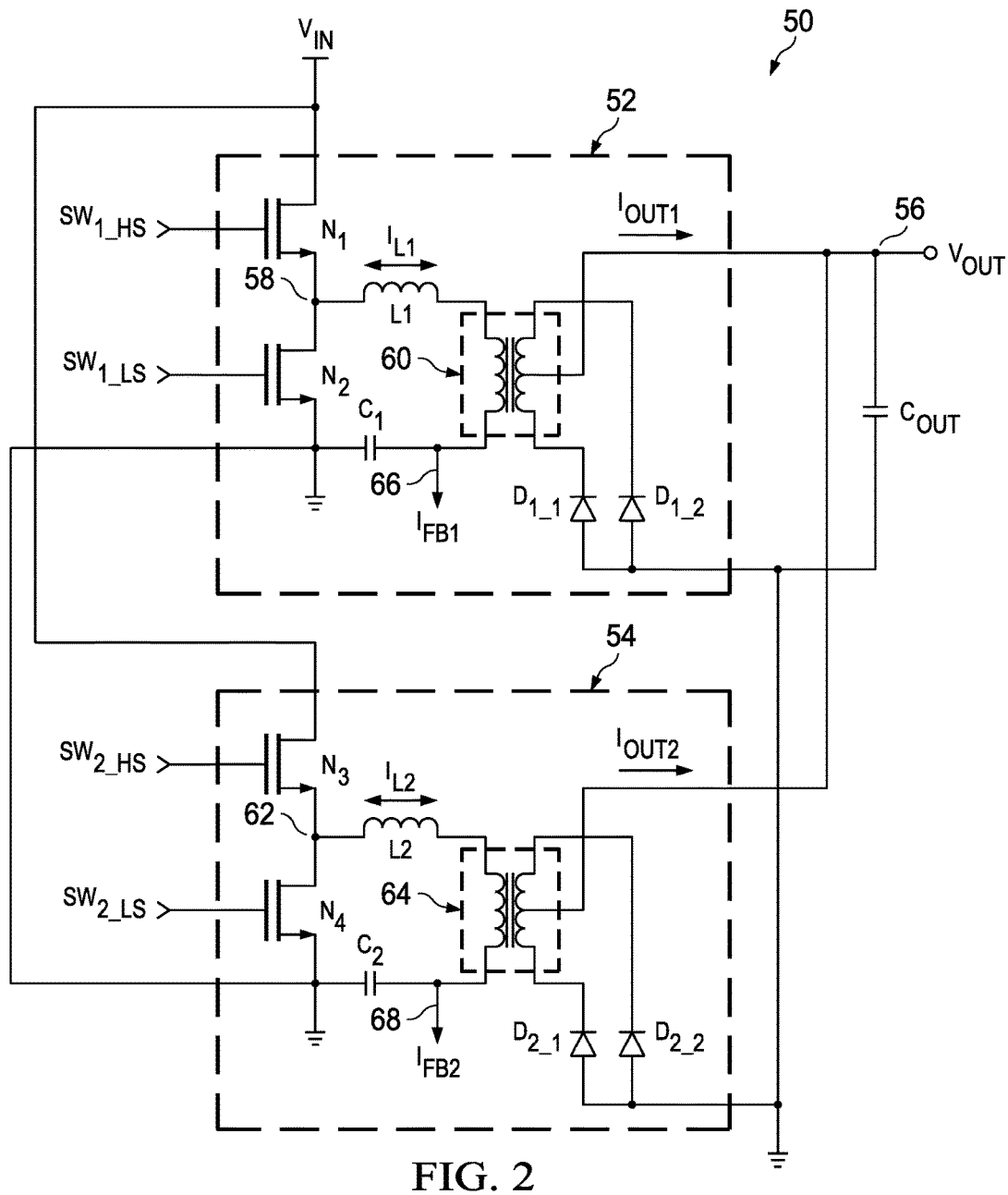
FIG. 2 illustrates an example of an interleaved resonant converter circuit.

FIG. 2 illustrates an example of an interleaved resonant converter circuit 50. The interleaved resonant converter system 50 can correspond to the interleaved resonant converter system 10 in the example of FIG. 1. In the example of FIG. 2, the interleaved resonant converter system 50 is demonstrated as a two-phase interleaved resonant converter system that converts a DC input voltage $V_{IN}$ to another DC voltage $V_{OUT}$. The interleaved resonant converter system 50 thus includes a first resonant converter 52 and a second resonant converter 54 that are each configured to generate the output voltage $V_{OUT}$ at an output node 56 across an output capacitor $C_{OUT}$ relative to a low-voltage rail (e.g., ground) based on the input voltage $V_{IN}$ at each of two phases that are 180° out-of-phase with respect to each other. As an example, each of the resonant converters 52 can be fabricated substantially the same, such as including substantially identical circuit components.

The resonant converter 52 includes a high-side switch, demonstrated as an N-channel field-effect transistor (FET) $N_1$ and a low-side N-FET $N_2$. The N-FET $N_1$ interconnects the input voltage $V_{IN}$ at a drain and a switching node 58 at a source, and is controlled by a switching signal $SW_{1\_HS}$. The N-FET $N_2$ interconnects the switching node 58 at a drain and a low-voltage rail, demonstrated as ground, at a source, and is controlled by a switching signal $SW_{1\_LS}$. Therefore, the switching signals $SW_{1\_HS}$ and $SW_{1\_LS}$ correspond to a single set of the switching signals $SW_1$ through $SW_N$ in the example of FIG. 1, and are thus generated via the switching controller 16. The resonant converter 52 also includes a transformer 60 having a primary winding that is coupled to an inductor $L_1$ that interconnects the primary winding and the switching node 58, and is also coupled to a capacitor $C_1$ that interconnects the primary winding with the low-voltage rail. The transformer 60 includes a secondary winding that is coupled to the output node 56, and to cathodes of a first diode $D_{1\_1}$ and a second diode $D_{1\_2}$ that are configured to conduct the output current $I_{OUT1}$ to generate the output voltage $V_{OUT}$ across the output capacitor $C_{OUT}$ during a first of the two sequential alternating phases.

In response to activation of the high-side N-FET $N_1$ via the switching signal $SW_{1\_HS}$, the input voltage $V_{IN}$ is coupled to the switching node 58 to provide a resonant tank current $I_{L1}$ through the inductor $L_1$ to the capacitor $C_1$. The resonant tank current $I_{L1}$ is induced from the primary winding to the secondary winding of the transformer 60, and thus through the diode $D_{1\_1}$ to provide the output current $I_{OUT1}$ to the output node 56. The switching signal $SW_{1\_HS}$ can be de-asserted to deactivate the high-side N-FET $N_1$, and the switching signal $SW_{1\_LS}$ can be subsequently asserted to activate the low-side N-FET $N_2$. In response to activation of the low-side N-FET $N_2$ via the switching signal $SW_{1\_LS}$, the resonant tank current $I_{L1}$ flows from the capacitor $C_1$ through the inductor $L_1$ to the low-side rail through the low-side N-FET $N_2$. Thus, the resonant tank current $I_{L1}$ reverses direction and is induced from the primary winding to the secondary winding of the transformer 60 in the opposite direction, such that the output current $I_{OUT1}$ flows through the diode $D_{1\_2}$ to the output node 56.

The resonant converter 54 includes a high-side switch, demonstrated as an N-FET $N_3$ and a low-side N-FET $N_4$. The N-FET $N_3$ interconnects the input voltage $V_{IN}$ at a drain and a switching node 62 at a source, and is controlled by a switching signal $SW_{2\_HS}$. The N-FET $N_4$ interconnects the switching node 62 at a drain and the low-voltage rail at a source, and is controlled by a switching signal $SW_{2\_LS}$. Therefore, the switching signals $SW_{2\_HS}$ and $SW_{2\_LS}$ correspond to another set of the switching signals $SW_1$ through $SW_N$ in the example of FIG. 1, and are thus generated via the switching controller 16. The resonant converter 54 also includes a transformer 64 having a primary winding that is coupled to an inductor $L_2$ that interconnects the primary winding and the switching node 62, and is also coupled to a capacitor $C_2$ that interconnects the primary winding with the low-voltage rail. The transformer 64 includes a secondary winding that is coupled to the output node 56, and to cathodes of a first diode $D_{2\_1}$ and a second diode $D_{2\_2}$ that are configured to conduct the output current $I_{OUT2}$ to generate the output voltage $V_{OUT}$ across the output capacitor $C_{OUT}$ during a second of the two sequential alternating phases.

In response to activation of the high-side N-FET $N_3$ via the switching signal $SW_{2\_HS}$, the input voltage $V_{IN}$ is coupled to the switching node 62 to provide a resonant tank current $I_{L2}$ through the inductor $L_2$ to the capacitor $C_2$. The resonant tank current $I_{L2}$ is induced from the primary winding to the secondary winding of the transformer 64, and thus through the diode $D_{2\_1}$ to provide the output current $I_{OUT2}$ to the output node 56. The switching signal $SW_{2\_HS}$ can be de-asserted to deactivate the high-side N-FET $N_3$, and the switching signal $SW_{2\_LS}$ can be subsequently asserted to activate the low-side N-FET $N_4$. In response to activation of the low-side N-FET $N_4$ via the switching signal $SW_{2\_LS}$, the resonant tank current $I_{L2}$ flows from the capacitor $C_2$ through the inductor $L_2$ to the low-side rail through the low-side N-FET $N_4$. Thus, the resonant tank current $I_{L2}$ reverses direction and is induced from the primary winding to the secondary winding of the transformer 64 in the opposite direction, such that the output current $I_{OUT2}$ flows through the diode $D_{2\_2}$ to the output node 56.

In the example of FIG. 2, the resonant converter 52 includes a current tap 66 between the primary winding of the transformer 60 and the capacitor $C_1$, and the resonant converter 54 includes a current tap 68 between the primary winding of the transformer 64 and the capacitor $C_2$. The current tap 66 is configured to provide a feedback current $I_{FB1}$ that is indicative of the amplitude of the resonant tank current $I_{L1}$, and thus the output current $I_{OUT1}$. Similarly, the current tap 68 is configured to provide a feedback current $I_{FB2}$ that is indicative of the amplitude of the resonant tank current $I_{L2}$, and thus the output current $I_{OUT2}$. The feedback currents $I_{FB1}$ and $I_{FB2}$ can be provided to the switching controller 16 to provide an indication of the relative amplitude of the resonant tank currents $IL_1$ and $IL_2$ of the respective resonant converters 52 and 54.

The switching controller 16 can thus be configured to compare the feedback currents $I_{FB1}$ and $I_{FB2}$ to determine if there is a difference in amplitude, and thus a difference in amplitude of the output currents $I_{OUT1}$ and $I_{OUT2}$. In response to determining a difference in amplitude of the output currents $I_{OUT1}$ and $I_{OUT2}$ based on a mismatch in gain between the resonant converters 52 and 54, the duty-cycle and frequency controller 18 can be configured to adjust the duty-cycle of the switching signals $SW_{1\_HS}$ and $SW_{1\_LS}$ relative to the duty-cycle of the switching signals $SW_{2\_HS}$ and $SW_{2\_LS}$. Accordingly, the variation of the duty-cycles of the switching signals $SW_{1\_HS}$ and $SW_{1\_LS}$ relative to the switching signals $SW_{2\_HS}$ and $SW_{2\_LS}$ can result in an approximately equal amplitude of the output currents $I_{OUT1}$ and $I_{OUT2}$, and thus an approximately equal amplitude contribution of the output voltage $V_{OUT}$ at each of the two sequential alternating phases.

As an example, the switching controller 16 can determine that the amplitude of the resonant tank current $I_{L2}$ is greater than the amplitude of the resonant tank current $I_{L1}$ based on a relative amplitude of the feedback currents $I_{FB1}$ and $I_{FB2}$. For example, the feedback current $I_{FB2}$ can have a greater amplitude than the feedback current $I_{FB1}$. In response, the duty-cycle and frequency controller 18 can be configured to decrease the duty-cycle of the switching signals $SW_{2\_HS}$ and $SW_{2\_LS}$ relative to the switching signals $SW_{1\_HS}$ and $SW_{1\_LS}$. While the duty-cycle and frequency controller 18 is described as decreasing the duty-cycle of a given pair of the switching signals $SW_1$ and $SW_2$, it is to be understood that the duty-cycle and frequency controller 18 is not limited to decreasing duty-cycles, but could instead increase the duty-cycle of a given pair of the example of the switching signals $SW_1$ and $SW_2$. As a result, the high-side N-FET $N_3$ can be activated for less time than the high-side N-FET $N_1$ in the alternate sequential phases, and the low-side N-FET $N_4$ can be activated for less time than the low-side N-FET $N_2$ in the alternate sequential phases. Accordingly, the resonant tank current $I_{L2}$ can be decreased, such that the output current $I_{OUT2}$ can be decreased to be approximately equal to the output current $I_{OUT1}$. Accordingly, the contribution to the output voltage $V_{OUT}$ can be approximately equal at each of the respective phases in response to the respective output currents $I_{OUT1}$ and $I_{OUT1}$.

Figure 3:
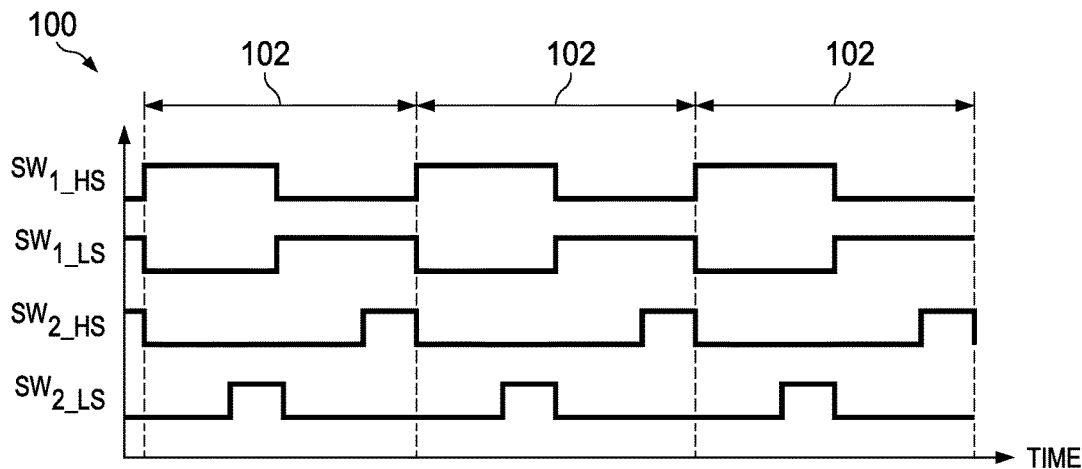
FIG. 3 illustrates example of a timing diagram.

FIG. 3 illustrates example of a timing diagram 100. The timing diagram 100 demonstrates a first set of switching signals corresponding to the switching signals $SW_{1\_HS}$ and $SW_{1\_LS}$ and a second set of switching signals corresponding to the switching signals $SW_{2\_HS}$ and $SW_{2\_LS}$. In the example of FIG. 3, the switching signals $SW_{1\_HS}$ and $SW_{1\_LS}$ are demonstrated to have an approximately 50% duty-cycle in each of the switching periods, demonstrated at 102, such that the logic-state of the respective switching signals $SW_{1\_HS}$ and $SW_{1\_LS}$ is complementary. It is to be understood that the switching signals $SW_{1\_HS}$ and $SW_{1\_LS}$ can be generated to have a dead-time between de-assertion and complementary assertion of the respective switching signals $SW_{1\_HS}$ and $SW_{1\_LS}$ to prevent a shoot-through current associated with the high-side N-FET $N_1$ and low-side N-FET $N_2$. The dead-time is not demonstrated in the example of FIG. 3 for simplicity.

As described in the previous example, the switching controller 16 can determine that the amplitude of the resonant tank current $I_{L2}$ is greater than the amplitude of the resonant tank current $I_{L1}$ based on a relative amplitude of the feedback currents $I_{FB1}$ and $I_{FB2}$. In response, the duty-cycle and frequency controller 18 can be configured to decrease the duty-cycle of the switching signals $SW_{2\_HS}$ and $SW_{2\_LS}$ relative to the switching signals $SW_{1\_HS}$ and $SW_{1\_LS}$. In the example of FIG. 3, the switching signals $SW_{2\_HS}$ and $SW_{2\_LS}$ are demonstrated as having a smaller duty-cycle, and thus a smaller activation time (e.g., assertion) relative to the switching signals $SW_{1\_HS}$ and $SW_{1\_LS}$. As an example, the duty-cycle and frequency controller 18 can be configured to decrease the duty-cycle of the switching signals $SW_{2\_HS}$ and $SW_{2\_LS}$ by delaying a rising-edge of switching signals $SW_{1\_HS}$ and $SW_{1\_LS}$, and thus by substantially aligning a falling-edge of one of the switching signals $SW_{2\_HS}$ and $SW_{2\_LS}$ with a complementary one of the switching signals $SW_{1\_HS}$ and $SW_{1\_LS}$ in each of the periods 102. By aligning the falling-edge of the switching signals $SW_{2\_HS}$ and $SW_{2\_LS}$ with a complementary one of the switching signals $SW_{1\_HS}$ and $SW_{1\_LS}$ in each of the periods 102, the interleaving between the phases associated with the resonant converters 52 and 54 can be preserved, as opposed to aligning rising-edges or midpoints of the respective on-times of the switching signals $SW_{2\_HS}$ and $SW_{2\_LS}$. As described herein, the terms "substantially aligning" and "substantially aligned", as well as related terms, with respect to the falling-edge of the respective switching signals refers to an approximate alignment of the falling-edges of the respective switching signals based on a potential variation in dead-times of the switching signals relative to each other. Thus, in the example of FIG. 3, the falling-edge of the switching signal $SW_{2\_HS}$ is aligned 180° out-of-phase with respect to the falling-edge of the corresponding switching signal $SW_{1\_HS}$, and the falling-edge of the switching signal $SW_{1\_HS}$ is aligned 180° out-of-phase with respect to the falling-edge of the corresponding switching signal $SW_{1\_LS}$.

As a result, the high-side N-FET $N_3$ can be activated for less time than the high-side N-FET $N_1$ in the alternate sequential phases, and the low-side N-FET $N_4$ can be activated for less time than the low-side N-FET $N_2$ in the alternate sequential phases. Accordingly, the resonant tank current $I_{L2}$ can be decreased, such that the output current $I_{OUT2}$ can be decreased to be approximately equal to the output current $I_{OUT1}$. Accordingly, the contribution to the output voltage $V_{OUT}$ can be approximately equal at each of the respective phases in response to the respective output currents $I_{OUT1}$ and $I_{OUT2}$, as described herein. While the example of FIGS. 2 and 3 only demonstrate two respective phases, it is to be understood that the interleaved resonant converter system 10 is not limited to two phases, but can include more than two phases, as described herein, to provide the output voltage $V_{OUT}$ at each of a respective plurality of phases. Therefore, the duty-cycle and frequency controller 18 can be configured to compare all of the feedback currents $I_{FB1}$ through $I_{FBN}$, and can maintain one of the sets of switching signals $SW_1$ through $SW_N$ at approximately 50%, and can decrease at least one other (e.g., all) of the other sets of the switching signals $SW_1$ through $SW_N$ to less than 50% to substantially equalize the output currents $I_{OUT1}$ through $I_{OUTN}$, and thus the contribution to the output voltage $V_{OUT}$ at each of the plurality of phases.

Figure 4:
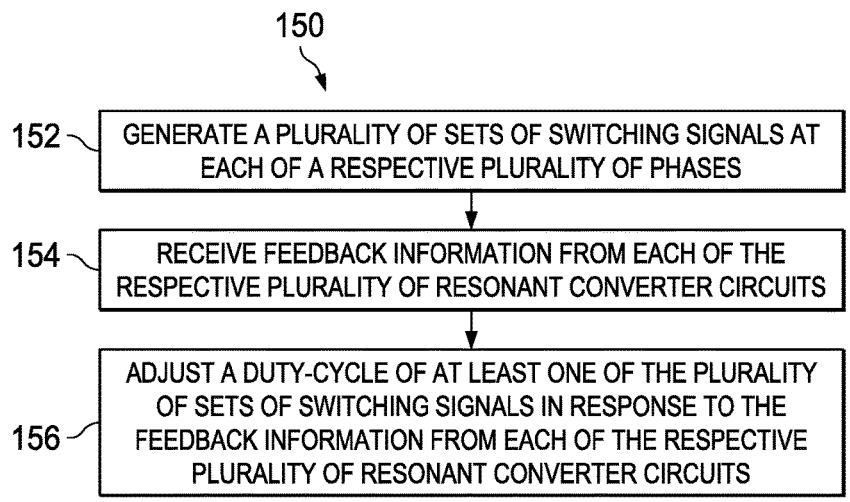
FIG. 4 illustrates a method for controlling an interleaved resonant converter system.

In view of the foregoing structural and functional features described above, a method in accordance with various aspects of the present disclosure will be better appreciated with reference to FIG. 4. While, for purposes of simplicity of explanation, the method of FIG. 4 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 4 illustrates an example of a method 150 for controlling an interleaved resonant converter circuit (e.g., the interleaved resonant converter system 10). At 152, a plurality of sets of switching signals (e.g., the switching signals $SW_1$ through $SW_N$) are generated at each of a respective plurality of phases. Each of the plurality of sets of switching signals can be provided to a respective plurality of resonant converter circuits (e.g., the resonant converters 12) that are each coupled to an output node (e.g., the output node 14) to collectively generate an output voltage (e.g., the output voltage $V_{OUT}$) on the output node in response to a respective plurality of sets of switching signals. At 154, feedback information (e.g., the feedback currents $I_{FB1}$ and $I_{FB2}$) from each of the respective plurality of resonant converter circuits is received. At 156, a duty-cycle of at least one of the plurality of sets of switching signals is adjusted in response to the feedback information of the respective plurality of resonant converter circuits.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. An interleaved resonant converter circuit comprising:
    a plurality of resonant converter circuits that are each coupled to an output node and are configured to collectively generate an output voltage on the output node in response to a respective plurality of sets of switching signals at each of a respective plurality of phases; and
    a switching controller configured to generate each of the plurality of sets of switching signals having a variable duty-cycle relative to each other at each of the plurality of phases;
    wherein the switching controller is configured to substantially align a falling-edge of each of at least one switching signal in a first set of switching signals of the plurality of sets of switching signals with a falling-edge of a respective switching signal of a second set of switching signals of the plurality of sets of switching signals, wherein each switching signal of the first set of switching signals has a first duty cycle and each switching signal of the second set of switching signals has a second duty cycle that is different from the first duty cycle.

2. The circuit of claim 1, wherein the variable duty-cycle is to provide a contribution of the output voltage to be substantially equal at each of the plurality of phases in response to a gain mismatch associated with each of the plurality of resonant converter circuits.

3. The circuit of claim 1, wherein each of the plurality of resonant converter circuits is configured to provide a feedback current associated with an amplitude of an output current of the respective one of the plurality of resonant converter circuits to the switching controller, wherein the switching controller is configured to adjust a duty-cycle of the respective one of the plurality of sets of switching signals in response to the feedback current.

4. The circuit of claim 3, wherein the switching controller is configured to adjust a duty-cycle of the respective one of the plurality of sets of switching signals in response to detecting that an amplitude of the output current of the respective one of the plurality of resonant converter circuits is different from an amplitude of the output current of at least one other resonant converter circuit of the plurality of resonant converter circuits.

5. The circuit of claim 3, wherein the switching controller is configured to set an amplitude of the output current of each of the plurality of resonant converter circuits to be substantially equal based on adjusting the duty-cycle of plurality of resonant converter circuits relative to each other based on the feedback current associated with each of the respective plurality of resonant converter circuits.

6. The circuit of claim 1, wherein each of the plurality of resonant converter circuits comprises:
    a transformer configured to induce a switching current from a primary winding of the transformer to a secondary winding of the transformer, wherein the output voltage is generated via the induced switching current through the secondary winding of the transformer; and
    at least one switch that is activated in response to a respective one of the plurality of sets of switching signals to provide the switching current through the primary winding during a respective one of the plurality of phases.

7. The circuit of claim 6, wherein each of the plurality of resonant converter circuits is configured to provide feedback associated with the amplitude of the switching current through the primary winding, wherein the switching controller is configured to adjust a duty-cycle of the respective one of the plurality of sets of switching signals in response to the feedback current.

8. The circuit of claim 6, wherein the at least one switch comprises:
    a high-side switch that is activated by a first switching signal in the respective one of the plurality of sets of switching signals; and
    a low-side switch that is activated by a second switching signal in the respective one of the plurality of sets of switching signals, wherein each of the first and second switching signals have a variable duty-cycle relative to the first and second switching signals associated with other sets of switching signals in the plurality of sets of switching signals.

9. An integrated circuit comprising at least a portion of the interleaved resonant converter circuit of claim 1.

10. A method for controlling an interleaved resonant converter circuit, the method comprising:
    generating a plurality of sets of switching signals at each of a respective plurality of phases, each of the plurality of sets of switching signals being provided to a respective plurality of resonant converter circuits that are each coupled to an output node to collectively generate an output voltage on the output node in response to a respective plurality of sets of switching signals;
receiving feedback information from each of the respective plurality of resonant converter circuits; and
adjusting a duty-cycle of at least one of the plurality of sets of switching signals in response to the feedback information from each of the respective plurality of resonant converter circuits, wherein adjusting the duty cycle of the at least one of the plurality of sets of switching signals comprises substantially aligning a falling-edge of each switching signal of the at least one set of switching signals with a falling-edge of a respective switching signal of at least another one of the plurality of sets of switching signals;
wherein each switching signal of the at least one of the plurality of sets of switching signals has a duty cycle that differs from each switching signal of the at least another one of the plurality of sets of switching signals.

11. The method of claim 10, wherein the feedback information comprises a plurality of feedback currents, each associated with a respective one of the plurality of resonant converter circuits, the method further comprising comparing an amplitude of each of the plurality of feedback currents, wherein adjusting the duty-cycle of the at least one of the plurality of sets of switching signals comprises adjusting the duty-cycle of the at least one of the plurality of sets of switching signals based on a relative amplitude of the plurality of feedback currents.

12. The method of claim 11, wherein adjusting the duty-cycle of the at least one of the plurality of sets of switching signals comprises decreasing a duty-cycle of the respective one of the plurality of sets of switching signals in response to detecting that the amplitude of the respective one of the plurality of feedback currents is greater than the amplitude of another one of the plurality of feedback currents.

13. The method of claim 10, wherein receiving the plurality of feedback currents comprises receiving the plurality of feedback currents associated with an amplitude of an output current of each of the respective plurality of resonant converter circuits, wherein adjusting the duty-cycle of the at least one of the plurality of sets of switching signals comprises adjusting the duty-cycle of the at least one of the plurality of sets of switching signals to substantially equalize the output current of each of the respective plurality of resonant converter circuits.

14. An interleaved resonant converter circuit comprising:
a plurality of resonant converter circuits that are each coupled to an output node and are configured to generate an output voltage on the output node at each of a plurality of phases, each of the plurality of resonant converter circuits comprising:
a transformer configured to induce a switching current from a primary winding of the transformer to a secondary winding of the transformer, wherein the output voltage is generated via the induced switching current through the secondary winding of the transformer; and
at least one switch that is activated in response to a respective one of a plurality of sets of switching signals to provide the switching current through the primary winding during a respective one of a plurality of phases; and
a switching controller configured to generate each of the plurality of sets of switching signals having a variable duty-cycle relative to each other at each of the plurality of phases based on a current mismatch associated with each of the plurality of resonant converter circuits and to substantially align a falling-edge of each of at least one switching signal of a first one of the plurality of sets of switching signals with a falling-edge of a respective switching signal of a second one of the plurality of sets of switching signals, wherein each signal of the first set of switching signals has a first duty cycle and each signal of the second set of switching signals has a second duty cycle that differs from the first duty cycle.

15. The circuit of claim 14, wherein each of the plurality of resonant converter circuits is configured to provide a feedback current associated with the amplitude of the switching current through the primary winding, wherein the switching controller is configured to adjust a duty-cycle of the respective one of the plurality of sets of switching signals in response to the feedback current.

16. The circuit of claim 15, wherein the switching controller is configured to adjust a duty-cycle of the respective one of the plurality of sets of switching signals in response to detecting that an amplitude of the output current of the respective one of the plurality of resonant converter circuits is different from an amplitude of the output current of at least one other resonant converter circuit of the plurality of resonant converter circuits.

17. The circuit of claim 16, wherein the switching controller is configured to set an amplitude of an output current of each of the plurality of resonant converter circuits to be substantially equal based on adjusting the duty-cycle of plurality of resonant converter circuits relative to each other based on the feedback current associated with each of the respective plurality of resonant converter circuits.

18. The interleaved resonant converter circuit of claim 1, wherein the plurality of resonant converter circuits includes a first resonant converter circuit and a second resonant converter circuit, wherein:
the first resonant converter circuit includes a first high side switch and a first low side switch, wherein the first high side switch is controlled in response to a first switching signal of the at least one of the plurality of sets of switching signals and the first low side switch is controlled in response to a second switching signal of the at least one of the plurality of sets of switching signals;
the second resonant converter circuit includes a second high side switch and a second low side switch, wherein the second high side switch is controlled in response to a third switching signal of the at least another one of the plurality of sets of switching signals and the second low side switch is controlled in response to a fourth switching signal of the at least another one of the plurality of sets of switching signals; and
the switching controller is configured to substantially align a falling-edge of the first switching signal with a falling-edge of the fourth switching signal and substantially align a falling-edge of the second switching signal with a falling-edge of the third switching signal.

19. The interleaved resonant converter circuit of claim 18, wherein, after the substantially aligning of the first and second switching signals, the falling-edge of the first switching signal is 180 degrees out-of-phase with respect to the falling-edge of the third switching signal and the falling-edge of the second switching signal is 180 degrees out-of-phase with respect to the falling-edge of the fourth switching signal.

* * * * *